Patented Oct. 27, 1931

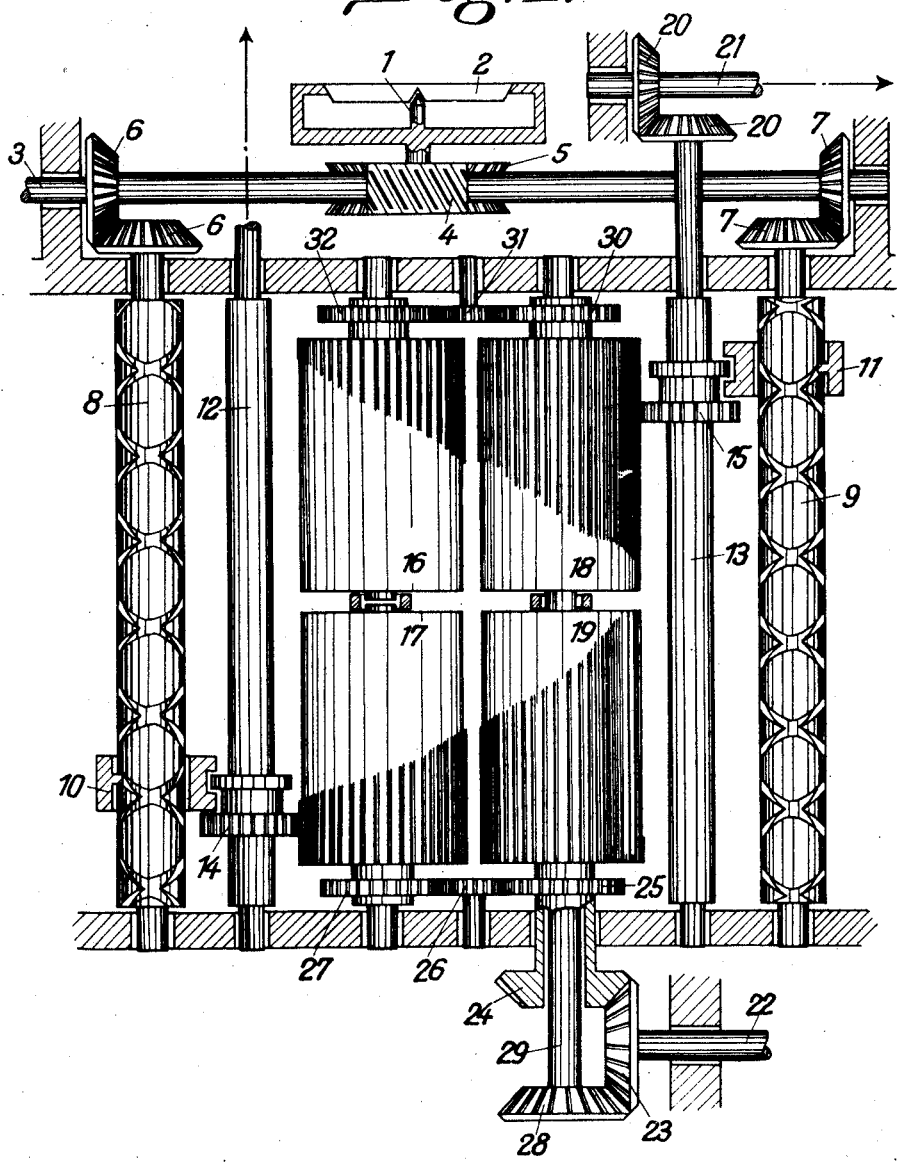

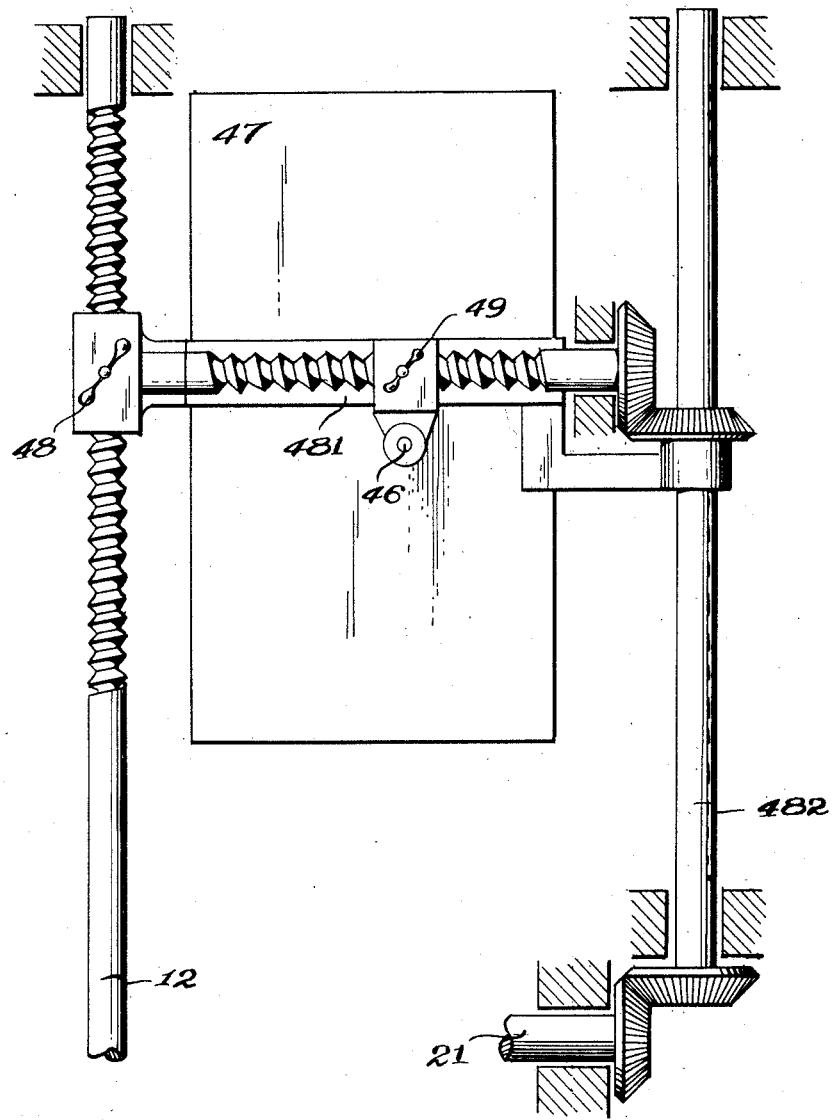

1,829,594

UNITED STATES PATENT OFFICE

REINHARD HUGERSHOFF, OF DRESDEN, GERMANY, ASSIGNOR TO THE FIRM IKARUS INTERNATIONALE PATENTVERWERTUNGS-AKTIEN-GESELLSCHAFT, OF VADUZ, LIECHTENSTEIN

DEVICE FOR CONTINUOUSLY RECORDING THE PATH OF FLIGHT OF AIRCRAFT

Application filed August 30, 1929, Serial No. 389,593, and in Germany July 27, 1929.

A device for continuously recording the path of flight of aircraft is already known, in which the driving shaft of a visual ground speedometer simultaneously drives the two driving shafts of a cross-slide carrying a stylus, the speeds of revolution of the cross-slide drive being proportional to the products of the ground speed into the sine and cosine respectively of the azimuth of the path. The special connection necessary for solving this problem between the direction indicator (compass) and the driving shafts of the ground speedometer is effected in the case of the known device by two controlling members known in elliptical trammels and by two friction discs. The technical disadvantages of transmitting power by friction are known.

Now according to the present invention, instead of each of the friction discs two stepped rollers are employed, of the type known for example in calculating machines. When a friction disc is employed, the friction wheel that receives rotary motion therefrom moves both in a clockwise and an anti-clockwise direction with continuously variable velocity according to its position in relation to the centre of the disc. The same effect is obtained by means of two coaxial oppositely rotating stepped rollers along which a toothed wheel is guided. With uniformly increasing length of the steps or rib-like projections meshing with the teeth of the toothed wheel, the angle of rotation of the toothed wheel produced by one revolution of the stepped rollers changes proportional to its displacement along the stepped rollers. With the employment of stepped rollers, which, as contrasted with friction discs and friction wheels, drive positively throughout, a further important advantage is connected. If the length of the individual steps is not increased uniformly, so that the line joining the ends of the steps in the development of the cylindrical surface would be a straight line, but in such a way that the line joining the ends of the steps gives a sine or cosine curve, the special controlling members may be omitted. Then only the toothed wheel designed for taking off the speed is displaced proportionally to the angle of rotation of the direction indicator, the compass needle for example, this being done in such a way that the amplitude of the displacement of the toothed wheel corresponding to a rotation of each pointer through 180° is equal to the total length of the two coaxial stepped rollers. The displacement of the toothed wheel is preferably effected by a grooved shaft with opposite screw threads, so that after a rotation of the pointer of the direction indicator through 180°, the toothed wheel is automatically returned. It is also possible to replace the two friction discs of the known device mentioned above by a single pair of stepped rollers, since the sine curve and the cosine curve only differ in phase.

The invention is illustrated by way of example, in the accompanying drawings.

Figure 1 is a plan view of the invention shown partly in section.

Fig. 2 is a plan view of a cross-slide and associated shafts forming part of the present device.

As a direction indicator a compass is employed, preferably a magnetic compass having a needle 2 resting upon a centre pin 1. The plane of section passes through the centre pin 1. By the aid of a crank, not shown, a shaft 3 is rotated, whereby the pointer of the compass can be adjusted, by means of a worm 4 and wormwheel 5, to the position occupied at any time by the north end of the needle 2. Transport spindles 8 and 9, provided with groove-like opposite screw threads, are driven by the shaft 3 through pairs of bevel gears 6 and 7, whereby nut members 10 and 11 are displaced along the spindles, carrying with them toothed wheels 14 and 15 sliding along grooved shafts 12 and 13. The grooved shaft 12 is at the same time the driving shaft of a cross-slide, for the movement proportional to $v \cos \alpha$, and the grooved shaft 13 drives by means of a pair of bevel gears 20, a cross-slide shaft 21, which gives the $v \sin \alpha$ component of the travel.

The toothed wheels 14 and 15 mesh with the pairs of stepped rollers 16, 17 and 18, 19. Both pairs are driven by a shaft 22 coming from a visual speedometer. By a bevel gear 23, mounted on the shaft 22 and meshing with a bevel gear 24 are driven the stepped roller 19 and a toothed wheel 25, which are both mounted fast upon the hollow shaft of the bevel gear 24. By the toothed wheel 25 the stepped roller 17 is driven through the medium of an intermediate wheel 26 and a toothed wheel 27, this roller being driven in the same direction as the stepped roller 19. The bevel gear 23, however, also rotates a bevel gear 28, and with it a shaft 29, which extends through the hollow shaft of the bevel gear 24 and the stepped roller 19, and at its other end is connected fast to the stepped roller 18. The latter accordingly revolves in the opposite direction to the stepped roller 19. The stepped roller 18 in its turn drives the roller 16 in the same direction, through the medium of toothed wheels 30, 31 and 32.

The driving shafts 12 and 21 are at rest, according to the values cos $\alpha = 0$ and sine $\alpha = 0$ respectively, when the toothed wheels 14 and 15 are opposite to the gaps between the associated stepped rollers 16, 17 and 18, 19. The breadth of the toothed wheels 14 and 15 respectively corresponds to the breadth of these gaps.

What I claim is:

1. Means for actuating the two cross slide elements of apparatus for continuously recording the path of flight of aircraft, comprising two shafts, one driving each of the two cross slide elements, a speedometer shaft adapted to drive both the cross slide elements at variable speeds, and a pair of stepped rollers interposed between the speedometer shaft and the shafts driving the cross slide elements.

2. Means for actuating the two cross slide elements of apparatus for continuously recording the path of flight of aircraft, comprising two shafts, one driving each of the two cross slide elements, a speedometer shaft adapted to drive both the said cross slide element shafts at variable speeds, and two pairs of stepped rollers interposed between the speedometer shaft and the shafts driving the cross slide elements.

3. Means for actuating the two cross slide elements of apparatus for continuously recording the path of flight of aircraft, comprising two shafts, one driving each of the two cross slide elements, a speedometer shaft adapted to drive both the said cross slide element shafts at variable speeds, and a pair of stepped rollers interposed between the speedometer shaft and the shafts driving the cross slide elements, the ends of the successive steps on the stepped rollers lying on a sine curve on one roller and on a cosine curve on the other.

4. Means for actuating the two cross slide elements of apparatus for continuously recording the path of flight of aircraft, comprising two shafts, one driving each of the two cross slide elements, a speedometer shaft adapted to drive both the said cross slide element shafts at variable speeds, a pair of stepped rollers interposed between the speedometer shaft and the shafts driving the cross slide elements, slidably mounted toothed wheels meshing with the stepped rollers and transmitting motion from the stepped rollers to the cross slide element shafts, a direction indicator such as a compass, and means for displacing the toothed wheels parallel to the stepped rollers through a distance depending upon the angle of rotation of the direction indicator.

5. Means for actuating the two cross slide elements of apparatus for continuously recording the path of flight of aircraft, comprising two shafts, one driving each of the two cross slide elements, a speedometer shaft adapted to drive both the said cross slide element shafts at variable speeds, a pair of stepped rollers interposed between the speedometer shaft and the shaft driving the cross slide elements, slidably mounted toothed wheels meshing with the stepped rollers and transmitting motion from the stepped rollers to the cross slide element shafts, a direction indicator such as a compass, two shafts each formed with a right-handed helical groove and a left-handed helical groove, and nut members mounted on the helically grooved shafts and engaging with the helical grooves therein and adapted when the said shafts are rotated to shift the toothed wheels parallel to the stepped rollers proportionally in one case to the sine and in the other case to the cosine of the angle of rotation of the direction indicator.

In testimony whereof I have signed my name to this specification.

REINHARD HUGERSHOFF.